US010931636B2

(12) United States Patent
Leung et al.

(10) Patent No.: US 10,931,636 B2
(45) Date of Patent: Feb. 23, 2021

(54) METHOD AND SYSTEM FOR RESTRICTING TRANSMISSION OF DATA TRAFFIC FOR DEVICES WITH NETWORKING CAPABILITIES

(71) Applicant: Pismo Labs Technology Limited, Kowloon (HK)

(72) Inventors: Wan Chun Leung, New Territories (HK); Patrick Ho Wai Sung, Kowloon (HK); Kit Wai Chau, Kowloon (HK)

(73) Assignee: Pismo Labs Technology Limited, Kowloon (HK)

( * ) Notice: Subject to any disclaimer, the term of this patent is extended or adjusted under 35 U.S.C. 154(b) by 267 days.

(21) Appl. No.: 15/947,775

(22) PCT Filed: Mar. 23, 2017

(86) PCT No.: PCT/IB2017/051682
§ 371 (c)(1),
(2) Date: Apr. 7, 2018

(87) PCT Pub. No.: WO2018/172818
PCT Pub. Date: Sep. 27, 2018

(65) Prior Publication Data
US 2020/0195609 A1 Jun. 18, 2020

(51) Int. Cl.
*H04L 29/06* (2006.01)
*H04L 12/741* (2013.01)

(52) U.S. Cl.
CPC .......... *H04L 63/0236* (2013.01); *H04L 45/74* (2013.01); *H04L 63/101* (2013.01); *H04L 63/1458* (2013.01); *H04L 2463/142* (2013.01)

(58) Field of Classification Search
CPC ... H04L 63/0236; H04L 63/101; H04L 45/74; H04L 2463/142; H04L 63/1458; H04L 29/08
See application file for complete search history.

(56) References Cited

U.S. PATENT DOCUMENTS 8,169,910 B1 * 5/2012 Kohn .................... H04L 43/026
                                                   370/235
8,572,696 B1 * 10/2013 Wiacek ................. H04W 4/185
                                                   726/4

(Continued)

FOREIGN PATENT DOCUMENTS

| CN | 105471915 A | 4/2016 |
| CN | 105681101 A | 6/2016 |

(Continued)

OTHER PUBLICATIONS

International Search Report in International Application No. PCT/IB2017/051682, dated Dec. 27, 2017.

(Continued)

*Primary Examiner* — Aravind K Moorthy
(74) *Attorney, Agent, or Firm* — Fisherbroyles, LLP

(57) ABSTRACT

A method and a system of restricting data packet transmission of an apparatus at a network node. The network node, during a first time period, updates a whitelist and does not restrict data packet transmission according to the whitelist. After the first time period, the network node determines corresponding destination address of each of the data packets and allows the data packets to be sent to the corresponding destination address if a criteria is satisfactory. The network node does not allow the data packets to be sent to the corresponding destination address if the criteria is not satisfactory. The whitelist is comprised of at least one destination address. The criteria is based on the at least one destination address. The whitelist list is stored in non-transitory computer readable storage medium in the network node.

20 Claims, 11 Drawing Sheets

(56) References Cited

U.S. PATENT DOCUMENTS

| | | | |
|---|---|---|---|
| 8,745,758 B2* | 6/2014 | Cholas | H04L 63/10 726/29 |
| 8,812,705 B1* | 8/2014 | Wang | G06F 16/9537 709/229 |
| 8,966,610 B2* | 2/2015 | Coppinger | H04L 63/0272 726/14 |
| 9,317,818 B1* | 4/2016 | Sarvestani | G06Q 10/02 |
| 9,369,434 B2* | 6/2016 | Kim | H04L 63/0227 |
| 9,389,993 B1* | 7/2016 | Okmyanskiy | G06F 16/00 |
| 9,509,746 B2* | 11/2016 | Mehta | G06F 8/61 |
| 9,961,079 B1* | 5/2018 | Wang | H04W 12/08 |
| 10,044,674 B2* | 8/2018 | Liu | H04L 67/10 |
| 10,193,890 B2* | 1/2019 | Uchizumi | H04L 63/0245 |
| 10,237,288 B2* | 3/2019 | Wei | H04L 12/2801 |
| 10,419,433 B2* | 9/2019 | Cooper | H04L 63/10 |
| 10,680,893 B2* | 6/2020 | Uchizumi | H04L 47/32 |
| 2003/0107590 A1* | 6/2003 | Levillain | H04L 41/0213 715/736 |
| 2008/0240100 A1* | 10/2008 | Smith | H04L 12/4641 370/392 |
| 2009/0058612 A1* | 3/2009 | Chung | G06K 7/0008 340/10.2 |
| 2009/0135722 A1* | 5/2009 | Boers | H04L 45/66 370/236 |
| 2011/0300867 A1* | 12/2011 | Matsuo | H04W 36/00835 455/436 |
| 2013/0111024 A1* | 5/2013 | Setia | H04L 67/02 709/225 |
| 2013/0125106 A1* | 5/2013 | Hanamoto | G06F 8/65 717/168 |
| 2013/0185643 A1* | 7/2013 | Greifeneder | H04L 67/02 715/736 |
| 2013/0254869 A1* | 9/2013 | McGrath | H04L 63/1458 726/11 |
| 2013/0293662 A1* | 11/2013 | Moran | H04M 7/0039 348/14.01 |
| 2014/0089498 A1* | 3/2014 | Goldfarb | H04L 43/028 709/224 |
| 2014/0215196 A1* | 7/2014 | Berlin | G06F 21/572 713/2 |
| 2015/0067764 A1* | 3/2015 | Kim | H04L 63/101 726/1 |
| 2015/0079937 A1* | 3/2015 | Adachi | H04W 12/0602 455/411 |
| 2016/0080254 A1* | 3/2016 | Zhou | H04L 45/38 370/392 |
| 2016/0088092 A1* | 3/2016 | Cardona-Gonzalez | H04L 67/18 709/227 |
| 2016/0133340 A1* | 5/2016 | Bowers | G11O 29/42 714/719 |
| 2016/0142285 A1* | 5/2016 | Lee | H04L 43/0811 370/392 |
| 2016/0198509 A1* | 7/2016 | Hayes, Jr. | H04W 4/14 370/329 |
| 2016/0266887 A1* | 9/2016 | Riley | H04L 67/34 |
| 2016/0285862 A1* | 9/2016 | Mondal | G06F 16/951 |
| 2016/0323318 A1* | 11/2016 | Terrill | H04L 63/0227 |
| 2017/0063861 A1* | 3/2017 | Uchizumi | H04L 63/0236 |
| 2017/0093915 A1* | 3/2017 | Ellis | H04W 12/08 |
| 2017/0324870 A1* | 11/2017 | Cao | H04M 3/436 |
| 2017/0364348 A1* | 12/2017 | Klitenik | H04L 12/2814 |
| 2018/0026986 A1* | 1/2018 | Nanjo | G06F 21/6209 726/4 |
| 2018/0165431 A1* | 6/2018 | Neumann | G06F 21/44 |
| 2018/0191755 A1* | 7/2018 | Monaco | H04L 63/1425 |
| 2018/0324146 A1* | 11/2018 | Meriac | H04L 63/1441 |
| 2018/0375953 A1* | 12/2018 | Casassa Mont | H04L 61/6022 |
| 2019/0190777 A1* | 6/2019 | Uchizumi | H04L 47/32 |

FOREIGN PATENT DOCUMENTS

| | | |
|---|---|---|
| CN | 106375472 A | 2/2017 |
| WO | 2013041880 A1 | 3/2013 |

OTHER PUBLICATIONS

Written Opinion of the international Searching Authority in International Application No. PCT/IB2017/051682, dated Dec. 27, 2017.

\* cited by examiner

METHOD AND SYSTEM FOR RESTRICTING TRANSMISSION OF DATA TRAFFIC FOR DEVICES WITH NETWORKING CAPABILITIES

TECHNICAL FIELD

The present invention relates in general to the field of restricting transmission of data traffic for devices with networking capabilities. More particularly, the present invention relates to updating a whitelist for destinations that are allowed to receive data from Internet of Things (IoT) devices and using the whitelist to restrict transmission of data traffic for the IoT devices.

BACKGROUND ART

Distributed Denial of Service (DDoS) attacks causing widespread disruption of legitimate internet activity are known. Massive amounts of business activities are being disrupted and massive economic loss is being suffered. Internet of Things (IoT) device infected with malicious code, can be used for landing DDoS attack. As there could be many IoT devices in a network, infected IoT devices may launch DDoS attack from the network. This is undesirable for operator of the network.

Further infected or uninfected IoT devices may send data to destinations that the operator of network does not want to. Not only such data transmission consumes network resources, confidential information, privacy, trade secrets could be compromised. Administrator of the network may have limited ability to configure most IoT devices as the IoT devices may not be configurable or under control of the vendors of the IoT devices. Presence of IoT devices in a network could be a security risk.

SUMMARY OF THE INVENTION

The present invention discloses method and system of restricting data packet transmission of an IoT device at a network node. The network node, during a first time period, updates a whitelist and does not restrict data packet transmission according to the whitelist. The network node, after the first time period, determines corresponding destination address of each of the data packets, allows the data packets to be sent to the corresponding destination address if a criteria is satisfactory and does not allow the data packets to be sent to the corresponding destination address if the criteria is not satisfactory. The whitelist is comprised of at least one destination address. The criteria is based on the at least one destination address. The whitelist list is stored in non-transitory computer readable storage medium in the network node.

According to one of the embodiments of the present invention, the first time period is less than 1 hour. The first time period commences when Media Access Control (MAC) address of the IoT device is detected by a processing unit of the network node the first time. The network node stores the MAC address of the IoT device and the destination address in the whitelist when updating the whitelist.

According to one of the embodiments of the present invention, the network node stores Internet Protocol (IP) address of the IoT device and the destination address in the whitelist when updating the whitelist.

According to one of the embodiments of the present invention, the first time period commences when brand name, model name and/or model number of the IoT device is determined by a processing unit of the network node.

According to one of the embodiments of the present invention, the network node receives an approval from a user of the IoT device or an administrator of the network node before allowing the data packets to be sent to the corresponding destination address if a criteria is satisfactory. The network node retrieves the destination addresses from a remote server. The network node resets the first time period after receiving an instruction from a user of the IoT device or an administrator of the network node.

According to one of the embodiments of the present invention, the network node, during the first time period, determines maximum data packet transmission rate of each of the at least one destination address. The whitelist is comprised of the maximum data transmission rate and criteria is comprised of the maximum data transmission rate.

DETAILED DESCRIPTIONS

Figure 1:
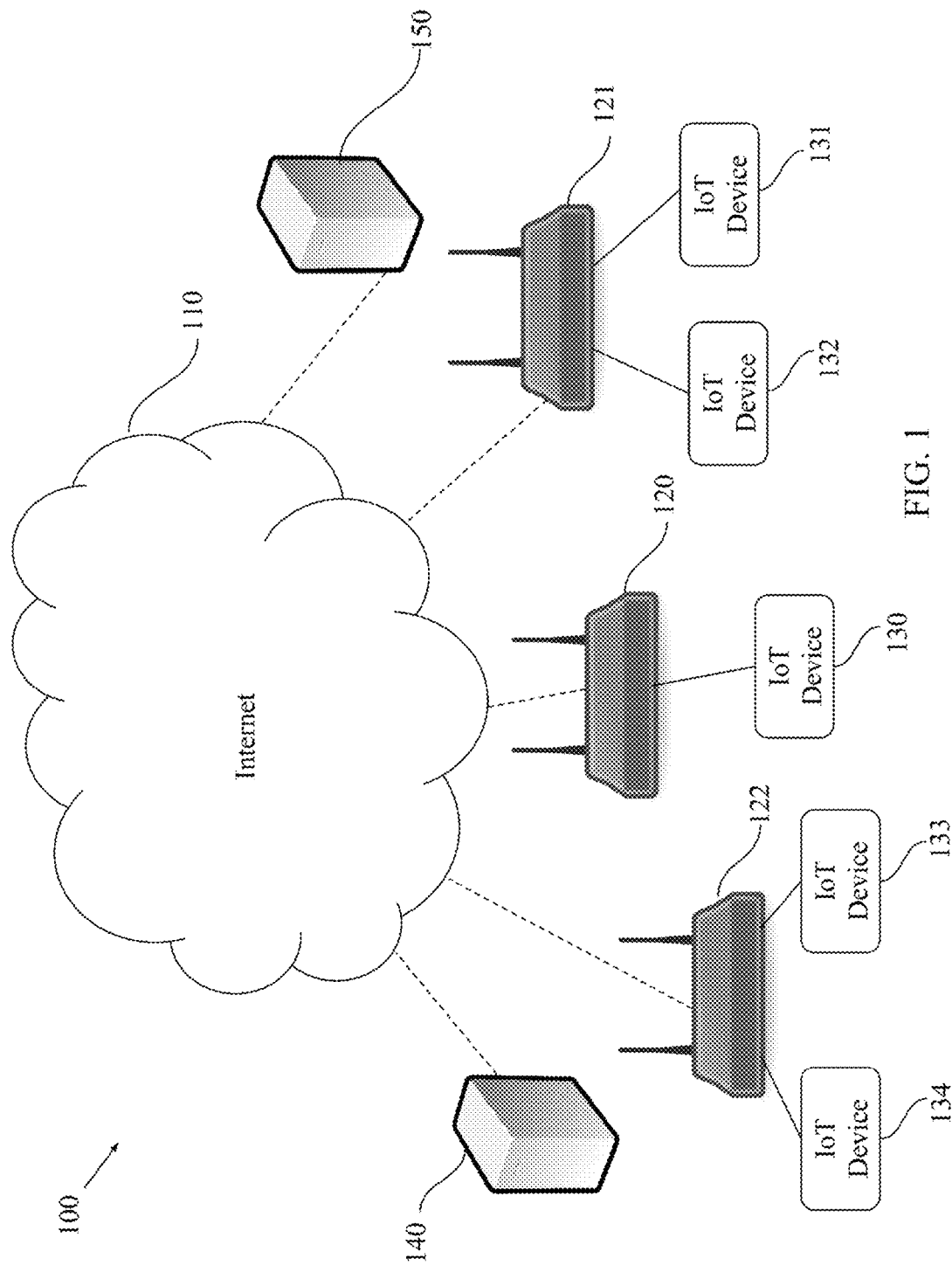
FIG. 1 illustrates a network configuration according to one of the embodiments of the present invention.

The ensuing description provides preferred exemplary embodiment(s) and exemplary embodiments only, and is not intended to limit the scope, applicability or configuration of the invention. Rather, the ensuing description of the preferred exemplary embodiment(s) and exemplary embodiments will provide those skilled in the art with an enabling description for implementing a preferred exemplary embodiment of the invention. It is understood that various changes may be made in the function and arrangement of elements without departing from the spirit and scope of the invention as set forth in the appended claims.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage unit, such as a secondary storage.

Moreover, as disclosed herein, the term "secondary storage" and "main memory" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and various other mediums capable of storing, containing or carrying instruction(s) and/or data. A machine-readable medium can be realized by virtualization, and can be a virtual machine readable medium including a virtual machine readable medium in a cloud-based instance.

Furthermore, embodiments may be implemented by hardware, software, firmware, middleware, microcode, hardware description languages, or any combination thereof. When implemented in software, firmware, middleware or microcode, the program instructions or code segments to perform the necessary tasks may be stored in a machine readable medium such as storage unit. A processing unit(s) may perform the necessary tasks. A processing unit(s) can be a CPU, an ASIC semiconductor chip, a semiconductor chip, a logical unit, a digital processor, an analog processor, a FPGA or any processor that is capable of performing logical and arithmetic functions. A program instruction may represent a procedure, a function, a subprogram, a program, a routine, a subroutine, a module, a software package, a class, or any combination of instructions, data structures, or program statements. A program instruction may be coupled to another program instruction or a hardware circuit by passing and/or receiving information, data, arguments, parameters, or memory contents. Information, arguments, parameters, data. etc. may be passed, forwarded, or transmitted via any suitable means including memory sharing, message passing, token passing, network transmission, etc. A processing unit(s) can be realized by virtualization, and can be a virtual processing unit(s) including a virtual processing unit in a cloud-based instance.

A network interface may be implemented by a standalone electronic component or may be integrated with other electronic components. A network interface may have no network connection or at least one network connection depending on the configuration. A network interface is only connected to one accessible network. Therefore, there may be more than one network connection being carried by one accessible network. A network interface may be an Ethernet interface, a frame relay interface, a fibre optic interface, a cable interface, a DSL interface, a token ring interface, a serial bus interface, a universal serial bus (USB) interface, Firewire interface, Peripheral Component Interconnect (PCI) interface, etc.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The program instructions may, in certain embodiments, be downloaded via computer networks such as the Internet, an intranet, LAN, MAN, WAN, the PSTN, a satellite communication system, a cable transmission system, and/or the like.

FIG. 1 illustrates a network configuration according to one of the embodiments of the present invention. Network 100 includes Internet 110, a plurality of network nodes 120, 121 and 122, a plurality of IoT devices 130, 131, 132, 133 and 134, server 140 for network node 120 and server 150 provided by a whitelist service provider.

In one embodiment, network node 120 receives and forwards data packets from IoT device 130. Network node 120 may be a firewall gateway, a router, a switch, an access point, or any device capable of receiving and forwarding data packets. IoT device 130 generates and sends data packets to destination addresses via network node 120 and Internet 110. IoT device 130 may be a surveillance camera, thermostats, cars, lights, refrigerators, any device capable of generating and sending data packets to destination addresses via Internet 110.

Network node 120 receives data packets from IoT device 130 and then sends the received data packets to destination addresses via Internet 110. The destination addresses are allowed to receive data packets from IoT device 130. Network node 120 uses a whitelist to allow data packets to be sent to the destination addresses.

Figure 2:
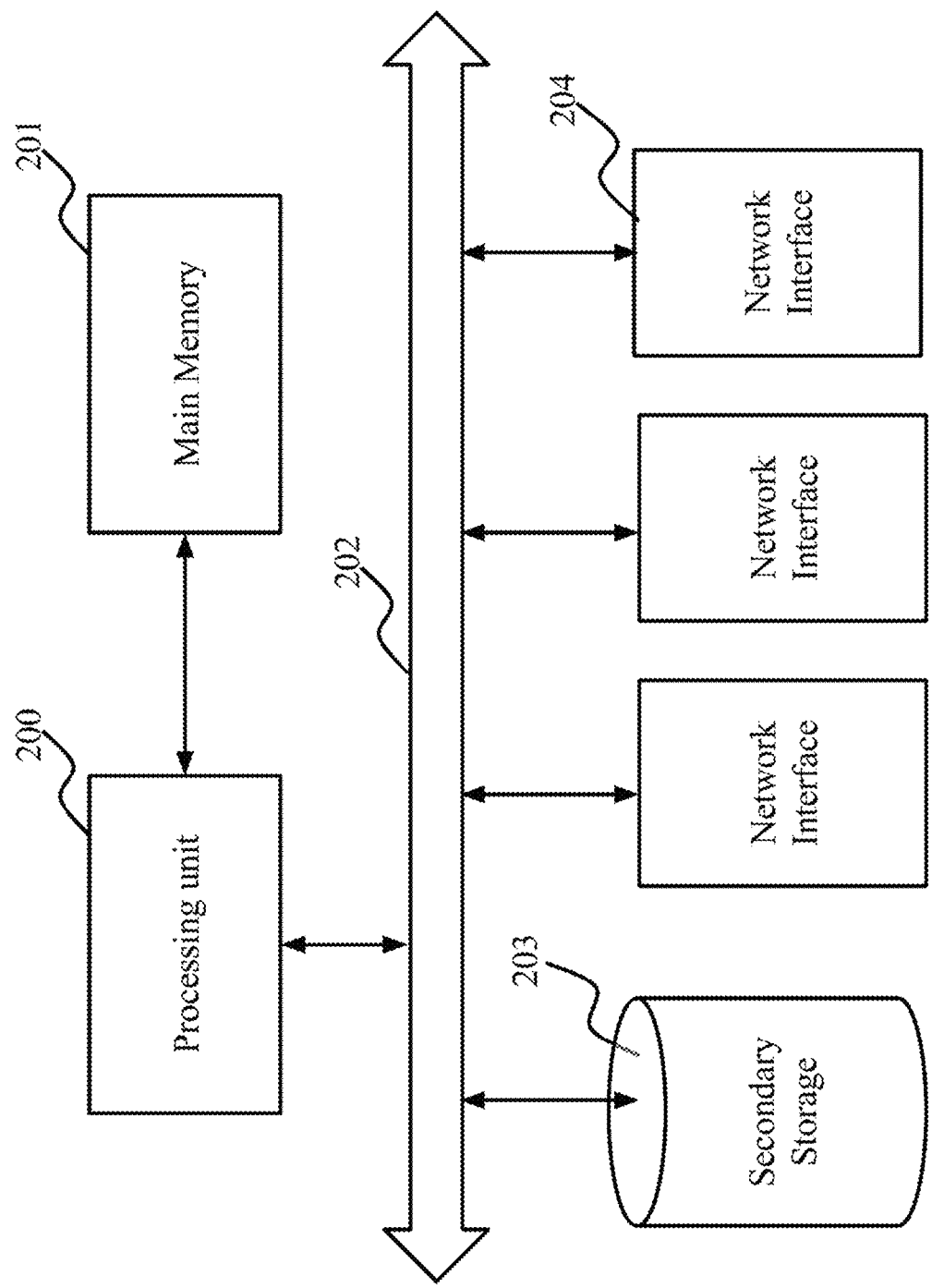
FIG. 2 is a block diagram of a network node according to one of the embodiments of the present invention.

FIG. 2 is an illustrative block diagram of network node 120 according to one of the embodiments of the present invention. Network node 120 comprises processing unit 200, main memory 201, system bus 202, secondary storage 203, and plurality of network interfaces 204. Processing unit 200 and main memory 201 are connected to each other directly. System bus 202 connects processing unit 200 directly or indirectly to secondary storage 203, and plurality of network interfaces 204. Using system bus 202 allows network node 120 to have increased modularity. System bus 202 couples processing unit 200 to secondary storage 203, and plurality of network interfaces 204. System bus 202 can be any of several types of bus structures including a memory bus, a peripheral bus, and a local bus using any of a variety of bus architectures. Secondary storage 203 stores program instructions for execution by processing unit 200.

Secondary storage 203 further stores conditions, wherein classification of established end-to-end connections into different groups depends on whether or not the established end-to-end connections satisfy the conditions.

In one particular embodiment, a network node whitelist used by network node 120 is stored in secondary storage 203 of network node 120. Network node 120 determines whether destination addresses of data packets originated from IoT device 130 are on the whitelist for IoT device 130. If the destination addresses are on the network node whitelist, network node 120 allows data packets to be transmitted to the destination addresses. If the destination addresses are not on the network node whitelist, network node 120 does not allow data packets to be transmitted to the destination addresses. The data packets are then dropped and/or a response is sent to IoT device 130 to indicate that the data packets are not transmitted to the destination addresses.

Figure 3A:
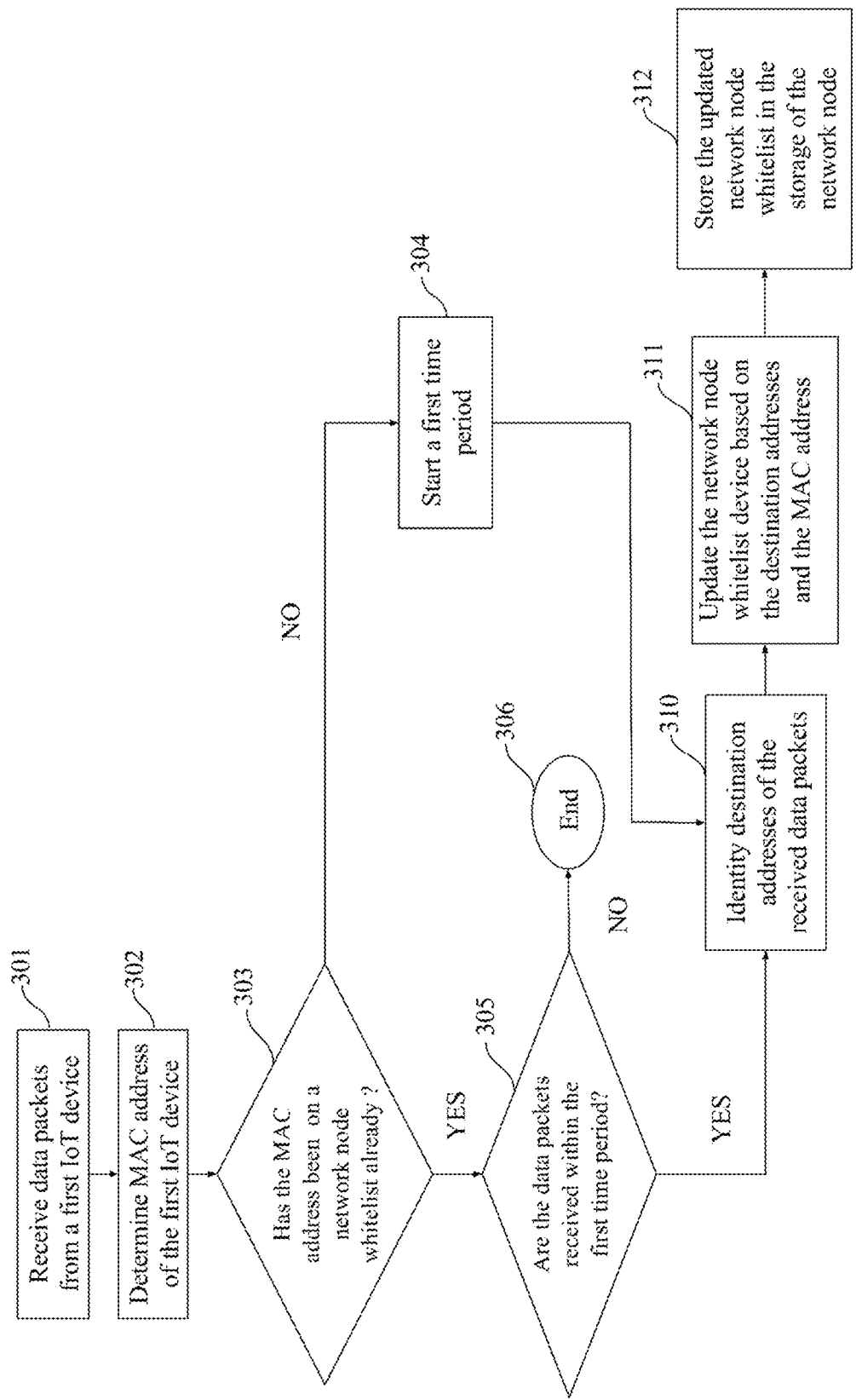
FIG. 3A illustrates a workflow to update a network node whitelist based on destination addresses of data packets identified within a first time period according to one of the embodiments of the present invention.

FIG. 3A illustrates an exemplary embodiment of workflow of updating a network node whitelist based on destination addresses of data packets identified within a first time period. One of the benefits of the workflow is that the network node whitelist is updated by the network node itself.

IoT device 130 has its own media access control (MAC) address that is able to be used for distinguishing IoT device 130 from other IoT devices. MAC has six octets and the first three octets of MAC address refer to an Organizationally Unique Identifier (OUI). The OUI is a 24-bit number that uniquely identifies a vendor, which is assigned by the IEEE. A full MAC address, OUI of MAC address or OUI combined with any bits of the last three octets of MAC address can be used for identification.

At block 301, processing unit 200 of network node 120 receives data packets from IoT device 130. At block 302, processing unit 200 determines MAC address of IoT device 130. At block 303, processing unit 200 determines whether the MAC address is on a network node whitelist. If the MAC address is not on the network node whitelist, processing unit 200 starts a first time period at block 304.

The first time period, for example, is set to one hour from the time that processing unit 200 received the first data packets from IoT device 130. There is no limitation that the first time period must be one hour. For example, the first time period can be as short as two minutes or even longer than a month. The first time period is a period of time for processing unit 200 to identify destination addresses of the received data packets. It is preferred not to set the first time period longer than three hours otherwise, processing unit 200 will update for a long period of time and computing resources and/or networking resources will not be used effectively. Further, if the first time period is too long, IoT device 130 may be hacked. Then the destination addresses on the network node whitelist may include undesired Internet Protocol (IP) address or Uniform Resource Locator (URL) and reduce the effectiveness of having the whitelist.

Processing unit 200 then identifies the destination addresses of the received data packets within the first time period at block 310. At block 311, the network node whitelist is updated based on the MAC address and the destination addresses such as IP address, domain name and URL. At block 312, the updated whitelist is stored in secondary storage 203.

At block 303, if the MAC address is on the network node whitelist, processing unit 200 will determine whether the data packets is received within the first time period at block 305. If the data packets is received within the first time period, actions at block 310 to block 312 will be performed. At block 305, if the data packets is received after expiration of the first time period, the workflow will end at block 306.

Figure 3B:
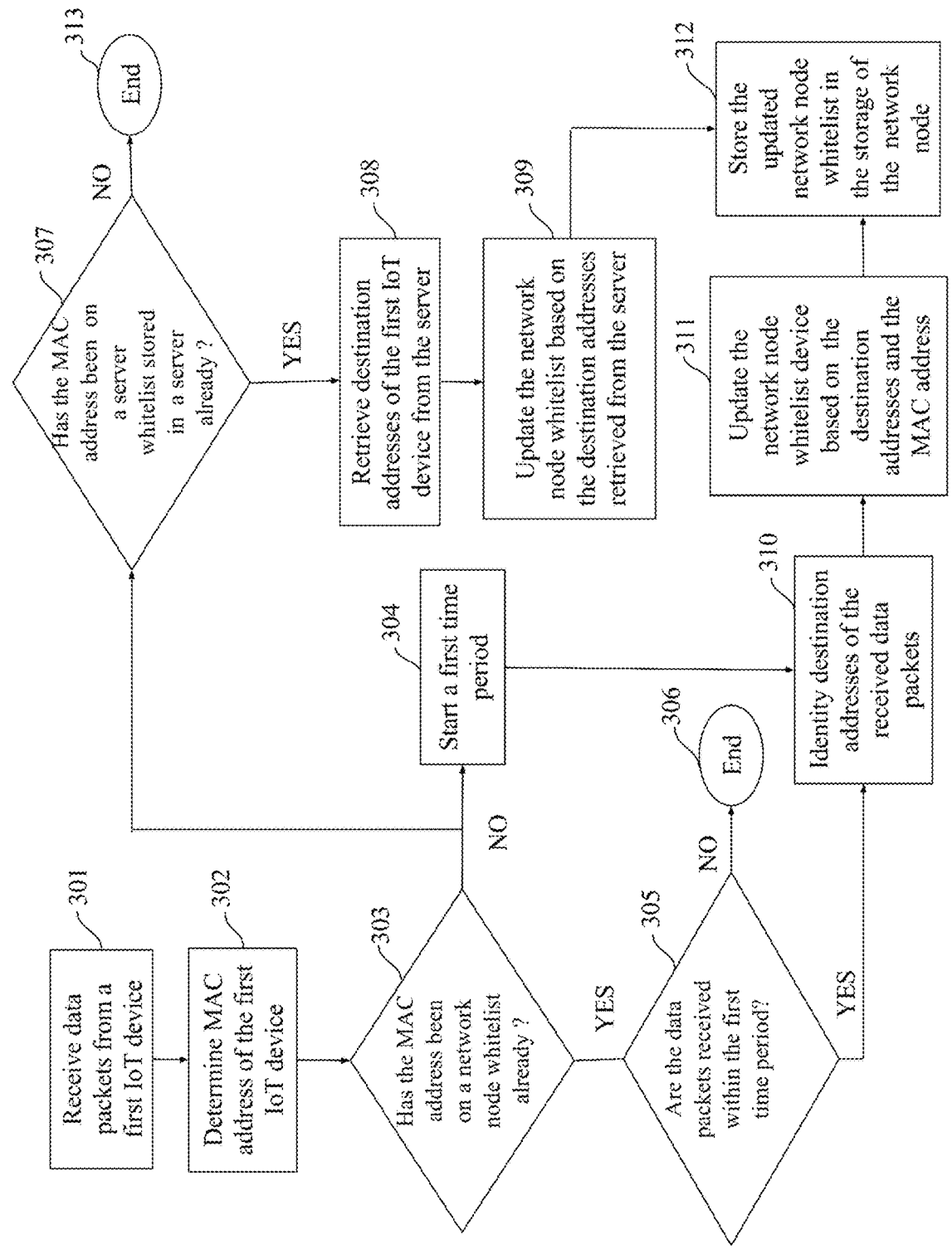
FIG. 3B illustrates an alternative workflow of FIG. 3A to update a network node whitelist based on destination addresses of data packets identified within a first time period at the network node and destination addresses retrieved from a server for the network node according to one of the embodiments of the present invention.

FIG. 3B illustrates an exemplary embodiment of an alternative workflow of FIG. 3A to update a network node whitelist based on destination addresses of data packets identified within a first time period and destination addresses retrieved from a server. One of the benefits of the workflow is that destination addresses of the IoT device are able to be obtained from the server.

At block 301, processing unit 200 of network node 120 receives data packets from IoT device 130. At block 302, processing unit 200 determines MAC address of IoT device 130. At block 303, processing unit 200 determines whether the MAC address is on a network node whitelist stored in storage 203. If the MAC address is on the network node whitelist, actions at block 305, block 310, block 311 and block 312 will be performed.

At block 303, if the MAC address is not on the network node whitelist, processing unit 200 will perform actions at block 304 and block 307 concurrently. At block 304, processing unit 200 starts a first time period. Actions at block 310, block 311 and block 312 will be performed.

At block 307, processing unit 200 communicates with server 140 and then determines whether the MAC address is on a server whitelist. If the MAC address is on the server whitelist, processing unit 200 retrieves destination addresses of IoT device 130 from the server at block 308. Processing unit 200 then updates the network node whitelist based on the destination addresses retrieved from server 140 at block 309. The updated network whitelist will be stored in secondary storage 203.

Figure 3C:
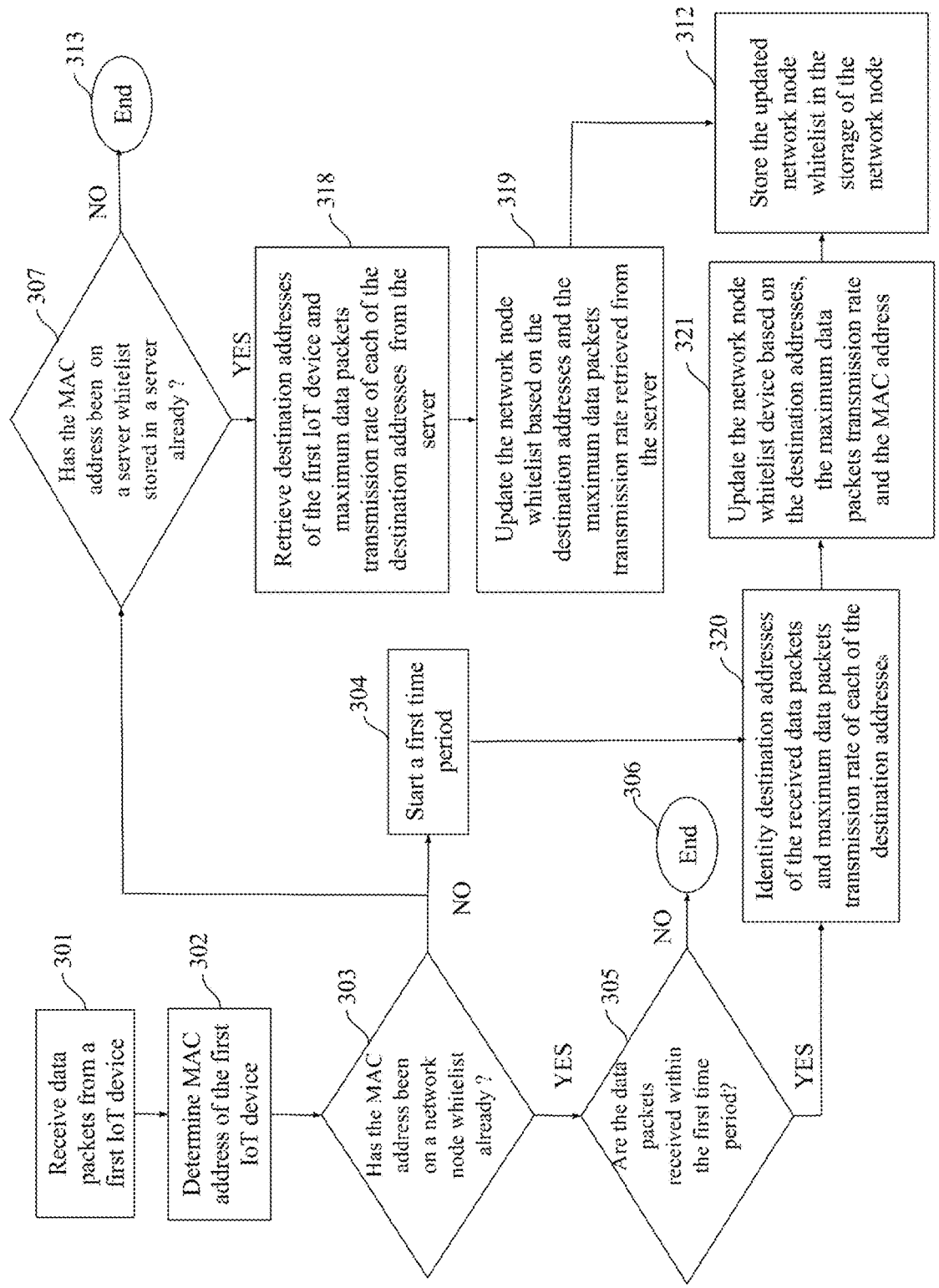
FIG. 3C illustrates an alternative workflow of FIG. 3B to update a network node whitelist based on destination addresses of data packets identified within a first time period and maximum data packet transmission rate of each of the destination addresses, and destination addresses of an IoT device and maximum data packet transmission rate of each the destination addresses retrieved from a server according to one of the embodiments of the present invention.

FIG. 3C illustrates an exemplary embodiment of an alternative workflow of FIG. 3B to update a network node whitelist for IoT device 130 based on destination addresses of data packets identified within a first time period and maximum data packet transmission rate of each of the destination addresses. Also, destination addresses of IoT device 130 and maximum data packet transmission rate of each of the destination addresses are retrieved from server 140 in order for network node 120 to update the network node whitelist. One of the benefits of the workflow is that data packet transmission rate of the destination addresses that are not on the network node whitelist is restricted.

At block 301, processing unit 200 of network node 120 receives data packets from IoT device 130. At block 302, processing unit 200 determines MAC address of IoT device 130. At block 303, processing unit 200 determines whether the MAC address is on a network node whitelist stored in storage 203. If the MAC address is on the network node whitelist, actions at block 305 will be performed. At block 320, processing unit 200 then identifies destination addresses of the received data packets within the first time period and maximum data packet transmission rate of each of the destination addresses. At block 321, the network node whitelist is updated based on the MAC address, the destination addresses and the maximum data packet transmission rate of each of the destination addresses. At block 312, the updated whitelist is stored in secondary storage 203.

At block 303, if the MAC address is not on the network node whitelist, processing unit 200 will perform actions at block 304 and block 307 concurrently. At block 304, processing unit 200 starts a first time period. Actions at block 320, block 321 and block 312 will be performed.

At block 307, processing unit 200 communicates with server 140 and then determines whether the MAC address is on a server whitelist. If the MAC address is on the server whitelist, processing unit 200 retrieves destination addresses of IoT device 130 and maximum data transmission rate of each of the destination addresses from server 150 at block 318. Processing unit 200 then updates the network node whitelist based on the destination addresses and the maximum data packet transmission rate retrieved from server 140 at block 309. The updated network whitelist will be stored in secondary storage 203.

In one particular embodiment, processing unit 200 determines data packet transmission rate of IoT device 130 to each of the destination addresses on the network node whitelist. The data packet transmission rate of IoT device 130 to each of the destination addresses on the network node whitelist is not allowed to exceed the corresponding maximum data packet transmission rate after expiration of the first time period. For destination addresses not on the network node whitelist, no data packets are allowed to be transmitted to theses addresses after expiration of the first time period. One of the benefits to restrict maximum data packet transmission rate is to control the amount of data being transmitted, and may limit the amount of network resources consumed by IoT devices.

In one variant, for destination addresses on the network node whitelist, data packet transmission rate of IoT device 130 to each of theses destination addresses is not allowed to exceed the corresponding maximum data packet transmission rate of the destination addresses after expiration of the first time period. For destination addresses not on the network node whitelist, data packet transmission of these destination addresses is limited to a threshold, for example, 10 kbps, 20 kbps or 100 kbps, after expiration of the first time period. One of the benefits to restrict data packet transmission rate is a threshold to allow IoT device 130 to communicate to new destinations after the expiration of the first time period while limiting the impact in case IoT device 130 is being used to launch DDoS attack.

In one particular embodiment, the user or the administrator is allowed to enter the maximum data packet transmission rate of each of the destination addresses, instead of detecting the maximum data packet transmission rate of each of the destination addresses by network node 120.

Figure 3D:
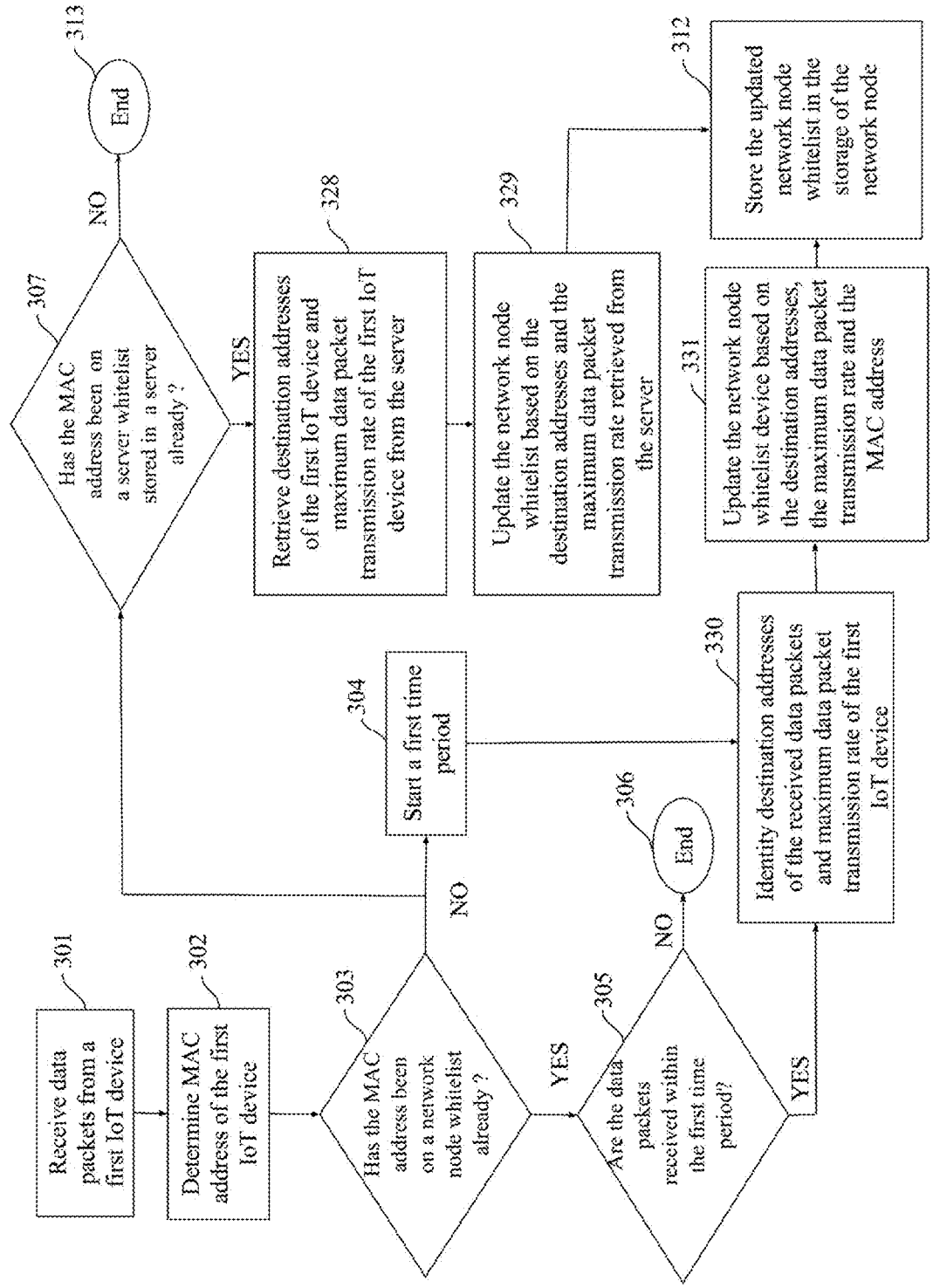
FIG. 3D illustrates an alternative workflow of FIG. 3C to update a network node whitelist based on destination addresses of data packets identified, maximum data packet transmission rate of an IoT device within a first time period, and destination addresses of the IoT device and maximum data packet transmission rate of the IoT device according to one of the embodiments of the present invention.

FIG. 3D illustrates an exemplary embodiment of an alternative workflow of FIG. 3C to update a network node whitelist based on destination addresses of data packets identified, maximum data packet transmission rate of an IoT device within a first time period, and destination addresses of the IoT device and maximum data packet transmission rate of the IoT device. For example, the maximum data packet transmission rate is measured based on total data packet transmission rate from an IoT device to all destinations within a specific time period. The highest data packet transmission rate is taken as maximum data packet transmission rate. For example, at a particular time, data transmission rate from the IoT device to address A is 10 kbps, to address B is 40 kbps and to address C is 25 kbps respectively, the total data packet transmission rate is therefore 75 kbps. If 75 kbps is the highest data packet transmission rate during the specific time period, the maximum data packet transmission rate for the IoT device is 75 kbps.

One of the benefits of the workflow is that total data packet transmission rate of the destination addresses being not on the network node whitelist is not allowed to exceed the maximum data packet transmission rate or even no data packet transmission for these destination addresses is allowed, in order to mitigate network traffic overflow.

At block 301, processing unit 200 of network node 120 receives data packets from IoT device 130. At block 302, processing unit 200 determines MAC address of IoT device 130. At block 303, processing unit 200 determines whether the MAC address is on a network node whitelist stored in storage 203. If the MAC address is on the network node whitelist, actions at block 305 will be performed. At block 330, processing unit 200 then identifies destination addresses of the received data packets and maximum data packet transmission rate of IoT device 130 within the first time period. At block 331, the network node whitelist is updated based on the MAC address, the destination addresses and the maximum data packet transmission rate. At block 312, the updated whitelist is stored in secondary storage 203.

At block 303, if the MAC address is not on the network node whitelist, processing unit 200 will perform actions at block 304 and block 307 concurrently. At block 304, processing unit 200 starts a first time period. Actions at block 330, block 331 and block 312 will be performed.

At block 307, processing unit 200 communicates with server 140 and then determines whether the MAC address is on a server whitelist. If the MAC address is on the server whitelist, processing unit 200 retrieves destination addresses of IoT device 130 and maximum data transmission rate of IoT device 130 from server 150 at block 328. Processing unit 200 then updates the network node whitelist based on the destination addresses and the maximum data packet transmission rate retrieved from server 140 at block 329. The updated network whitelist will be stored in secondary storage 203.

In one particular embodiment, processing unit 200 determines total data packet transmission rate of IoT device 130 to the destination addresses on the network node whitelist. The total data packet transmission rate of IoT device 130 to the destination addresses on the network node whitelist is not allowed to exceed the maximum data packet transmission rate of IoT device 130 after expiration of the first time period. For destination addresses not on the network node whitelist, no data packets are allowed to be transmitted to theses addresses after expiration of the first time period.

In one variant, for destination addresses on the network node whitelist, total data packet transmission rate of IoT device 130 to these destination addresses is allowed to exceed the maximum data packet transmission rate of IoT device 130 after expiration of the first time period. For destination addresses not on the network node whitelist, total data packet transmission rate of IoT device 130 to theses destination addresses is not allowed to exceed the maximum data packet transmission rate of IoT device 130 after expiration of the first time period.

In one particular embodiment, if a user of IoT device 130 or an administrator of network node 120 tries to update the network node whitelist after the expiration of the first time period, the user or the administrator is allowed to reset the network node whitelist by using an input interface, for example, a button, a knob, a keypad and a display panel. Once the network node whitelist is reset, new destination addresses can then be added to the network node whitelist. Network node 120 performs the workflow as illustrated in FIG. 3A, FIG. 3B, FIG. 3C or FIG. 3D.

One particular detailed embodiment, after the reset, all destination addresses on the network node whitelist removed. New destination addresses are required to be added to the network node whitelist again.

In one variant, after the reset, destination addresses on the network node whitelist are not removed. New destination addresses are then learnt during the new first time period. This allows more destination addresses to be added to the network node whitelist. This is particularly useful after the IoT device 130 is upgraded or is updated as IoT device 130 may legitimately visit legitimate destination addresses.

In one particular embodiment, the user or the administrator is allowed to approve the updated network node whitelist before network node 120 uses the updated network node whitelist for restricting data packets transmission. If no deficiencies are identified in the updated network node whitelist, the updated network node whitelist will be approved. If deficiencies are identified in the updated network node whitelist, the user is allowed to amend and then approve the network node whitelist. Once the network node whitelist is approved, network node 120 implements the network node whitelist to transmit data to the destination addresses on the network node whitelist.

In one particular embodiment, the user or the administrator is allowed to enter the maximum data packet transmission rate of IoT device 130, instead of detecting the maximum data packet transmission rate of IoT device 130 by network node 120.

In one particular embodiment, network node 120 generates and sends an analytical report to the user or the administrator on a regular basis. For example, the analytical report is generated and sent to the user or the administrator every day at midnight or the analytical report is generated and sent to the user or the administrator every Monday at midnight.

The analytical report includes destination addresses on the whitelist-and destination addresses not on the whitelist. The analytical report further includes data packets transmission rate of each of the destination addresses. In one particular detail, the analytical report also includes number of requests to desired addresses and non-desired addresses. The analytical report may be used to help the user or the administrator to determine whether an IoT device is hacked or is visiting unknown destination addresses. Further the analytical report may assist the user or the administrator to add or remove desired destination addresses to the whitelist. The analytical report is sent as an email and/or message, and/or are shown as a web page and/or document. In one variant, the analytical report is sent to a third party, such as the whitelist service provider for further analysis. The whitelist service provider then provides suggestions or amendments to the whitelist based on the analytical report.

Figure 4A:
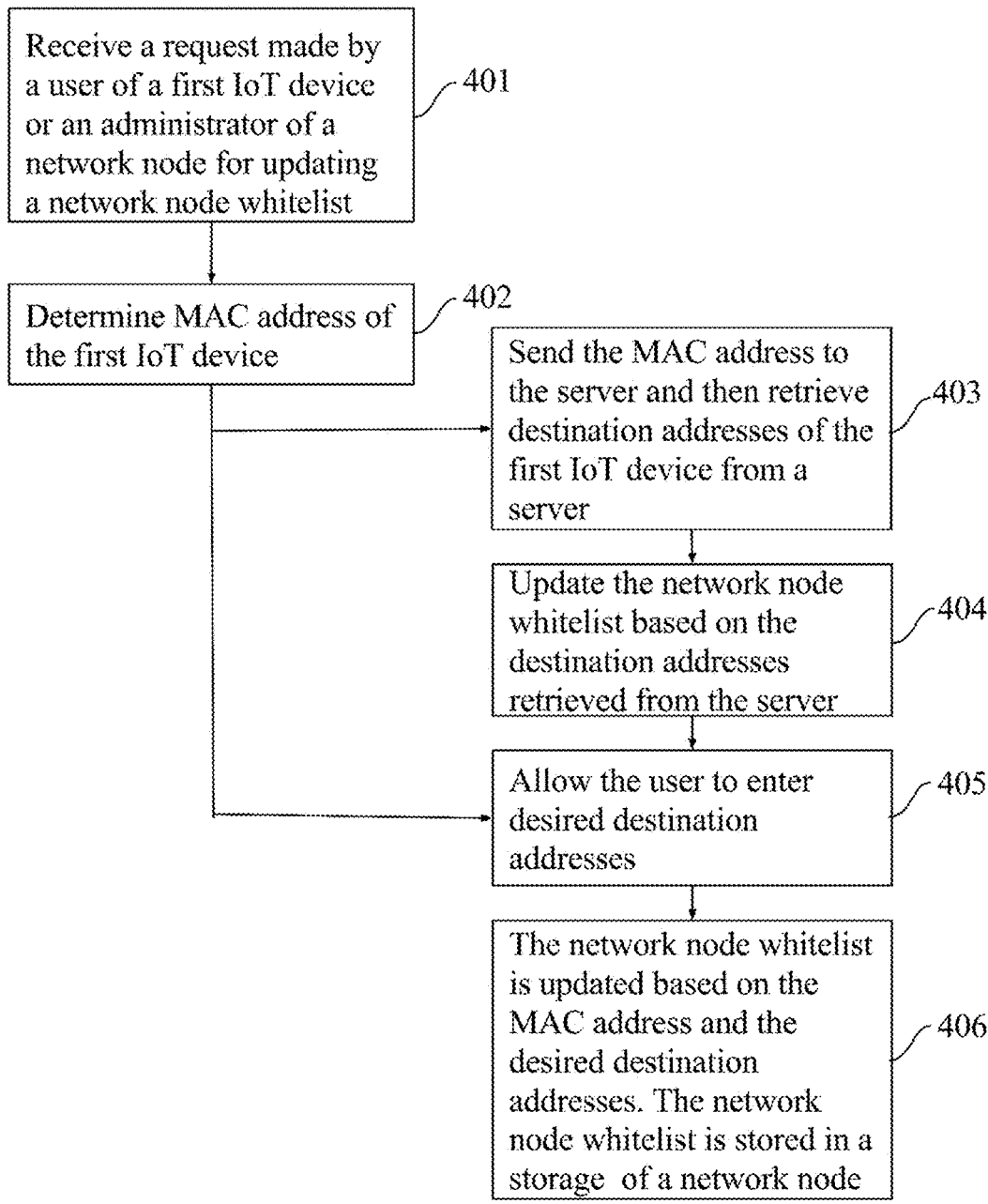
FIG. 4A illustrates a workflow of updating a network node whitelist based on desired destination addresses entered by a user of an IoT device or an administrator of a network node and MAC address of the IoT device according to one of the embodiments of the present invention.

FIG. 4A illustrates an exemplary embodiment of workflow of updating a network node whitelist based on desired destination addresses entered by a user of an IoT device or an administrator of a network node and MAC address of the IoT device. One of the benefits is that the user or the administrator updates a network node whitelist with desired destination addresses whenever the user or the administrator wishes to do.

At block 401, processing unit 200 of network node 120 receives a request made by a user of IoT device 130 or an administrator of network node 120 for updating a network node whitelist via for example an input interface, an application programming interface (API) or network. The input interface includes a webpage. At block 402, processing unit 200 determines MAC address of IoT device 130. Actions at block 403 and 405 will then be performed concurrently. At block 405, the user or the administrator is allowed to enter desired destination addresses via the webpage. For example, the desired destination addresses include port number, port range, domain name, URL, and IP address. At block 406, the network node whitelist is updated based on the desired destination addresses and the MAC address. The updated network node whitelist is stored in secondary storage 203.

At block 403, processing unit 200 sends the MAC address to server 140 and retrieves destination addresses of IoT device 130 from server 140 if the MAC address is on a server whitelist. At block 404, processing unit 200 updates the network node whitelist based on the destination addresses retrieved from server 140. Actions at block 405 and block 406 will then be performed. If the MAC address is not on the server whitelist, an empty destination address is returned to network node 120.

In one particular embodiment, the user or the administrator makes a request for updating the network node whitelist via the webpage. The user or the administrator is provided with login information or login device, for example a username and a password or a security token, to gain an access to the webpage. Once the user or the administrator enters the username and password to login the webpage, the user or the administrator is allowed to enter, the desired destination addresses and/or additional information such as information of protocol and "action type" information.

The information of protocol includes TCP, UDP, ICMP and IP and the "action type" information includes "Allow" or "Deny" action. The "Allow" action is to allow data to be transmitted. The "Deny" action is to deny data to be transmitted.

Figure 4B:
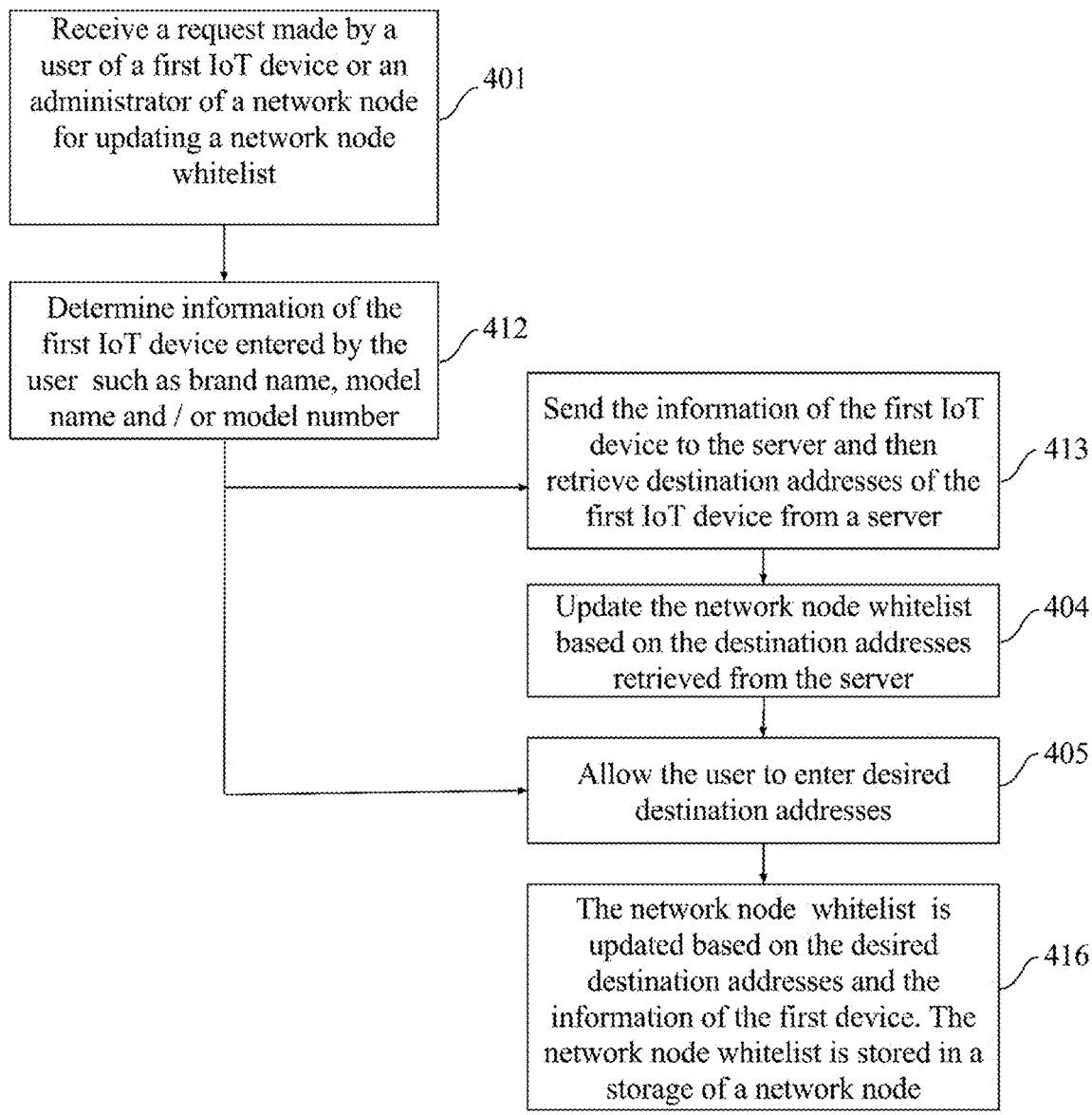
FIG. 4B illustrates an alternative workflow of FIG. 4A to update a network node whitelist based on desired destination addresses and information of an IoT device, entered by a user of the IoT device or an administrator of a network node according to one of the embodiments of the present invention.

FIG. 4B illustrates an alternative workflow of FIG. 4A to update a network node whitelist based on desired destination addresses and information of an IoT device. One of the benefits of the workflow is that users of IoT devices are more convenient to enter information of the IoT devices in order to update the network node whitelist.

At block 401, processing unit 200 receives a request made by a user of IoT device 130 or an administrator of network node 120 for updating a network node whitelist via a webpage. At block 412, the user or the administrator is allowed to enter information of IoT device 130 via the webpage. The user or the administrator is provided with login information or login device, for example a username and a password or a security token, to gain an access to the webpage. Once the user or the administrator enters the username and password to login the webpage, the user or the administrator is allowed to enter the information of IoT device 130 for example a brand name, a model name, a model number, date of manufacture and/or place of manufacture.

Once the user or the administrator enters the information of IoT device 130, actions at block 405 and at block 413 will be performed concurrently. The user or the administrator is allowed to enter desired destination addresses at block 405. At block 416, a network node whitelist is updated based on the desired destination addresses and the information of IoT device 130. The updated network node whitelist is stored in storage 203.

At block 413, processing unit 200 send the information of IoT device 130 to server 14. In one particular embodiment, based on the information of the IoT device 130, if IoT device 130 is one of an IoT device group on a server whitelist, corresponding destination addresses of the IoT device group will be retrieved by processing unit 200 from server 140. At block 404, the network node whitelist is updated based on the destination addresses retrieved from server 140. Actions at block 405 and block 416 will then be performed. If the information of IoT device 130 is not on the server whitelist, an empty destination address is returned to network node 120.

In one particular embodiment, the IoT device group includes IoT devices 130, 131 and 133. IoT devices 130, 131 and 133. IoT devices 130, 131 and 133 are connected with network nodes 120, 121 and 122 respectively. IoT devices 130, 131 and 133 share at least one common identifier with each other. For example, the identifier includes a brand name, a model name, a model number, date of manufacture, place of manufacture. In one example, IoT devices 130, 131 and 133 have the same brand name. In another example, IoT devices 130, 131 and 133 have the same brand name with the same model name and/or model number.

The brand name is used for grouping IoT devices that are manufactured and managed by a same vendor. The model name and/or model number is used to further identify or categorize IoT devices from the same vendor. The date of manufacture and/or place of manufacture is also used for further identification and categorization.

To facilitate the user or the administrator to input the information of the IoT device, a pull-down menu or scrollable list is provided in the webpage. The pull-down menu or scrollable list contains one or more input fields. In one particular embodiment, the field includes a brand name field, a model name field, a model number field, a date of manufacture field and/or a place of manufacture field. The brand name field, model name field and model number contain the brand names, model names, model numbers for the IoT devices group respectively. There is no limitation how many input fields are used. For example, the brand name field and model name field are used together or the brand name field, model name field and model number field are used together.

In one particular embodiment, the user or the administrator selects a corresponding brand name for IoT device 130 at the brand name field by pulling down a bar or scrolling down a bar. The user or the administrator then selects model name for IoT device 130 at the model name field. The user or the administrator then selects the model number for the IoT device 130 at the model number field.

Figure 5A:
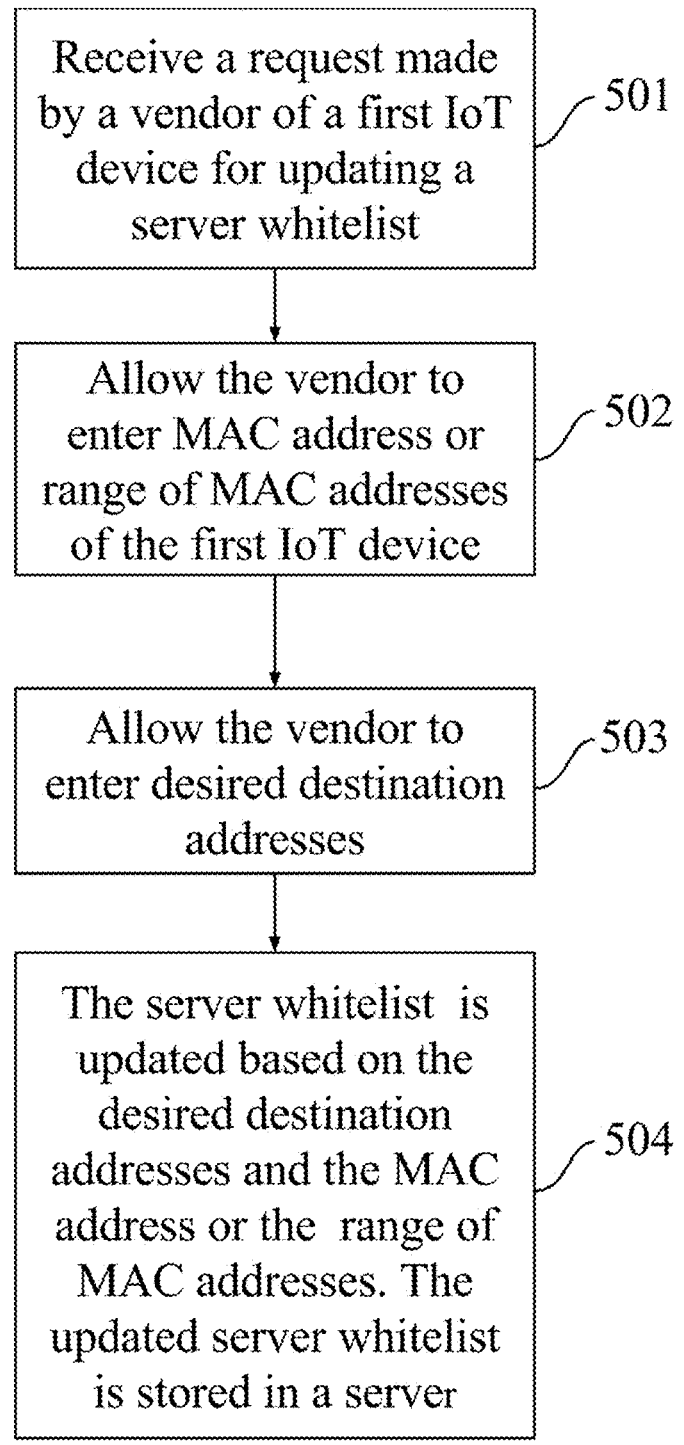
FIG. 5A illustrates a workflow of updating a server whitelist by a vendor of an IoT device at a server, based on MAC address or a range of MAC addresses of IoT device according to one of the embodiments of the present invention.

FIG. 5A illustrates an exemplary embodiment of a workflow of updating a server whitelist by a vendor of an IoT device based on MAC address or a range of MAC addresses of the IoT device. The server whitelist is stored in a server provided by a whitelist service provider. One of the benefits of the workflow is that the latest destination addresses are obtained from the vendor.

At block 501, server 150 receives a request made by a vendor of IoT device 130 for updating a server whitelist via a webpage. At block 502, the vendor is allowed to enter MAC address or a range of MAC addresses of IoT device 130 via the webpage. At block 503, the vendor is allowed to enter desired destination addresses. At block 504, a server whitelist is updated based on the desired destination addresses and the MAC address or the range of MAC address. The updated server whitelist is stored in server 150.

The whitelist at server 150 is inputted by the vendor via a webpage. The whitelist service provider requires the vendor to provide OUI and other documents to prove the vendor's identity and authority, such as business registration documents, in order to grant access right of the input interface to the vendor. Once the identity of the vendor is authenticated, the whitelist service provider furnishes login information or login device to the vendor, for example, a username and a password or a security token to gain an access to the webpage. Once the vendor enters the username and password to login the webpage, the vendor is allowed to enter the MAC address or the range of the MAC addresses and the desired destination addresses such as URL, domain name and IP address, in order to update its server whitelist.

Figure 5B:
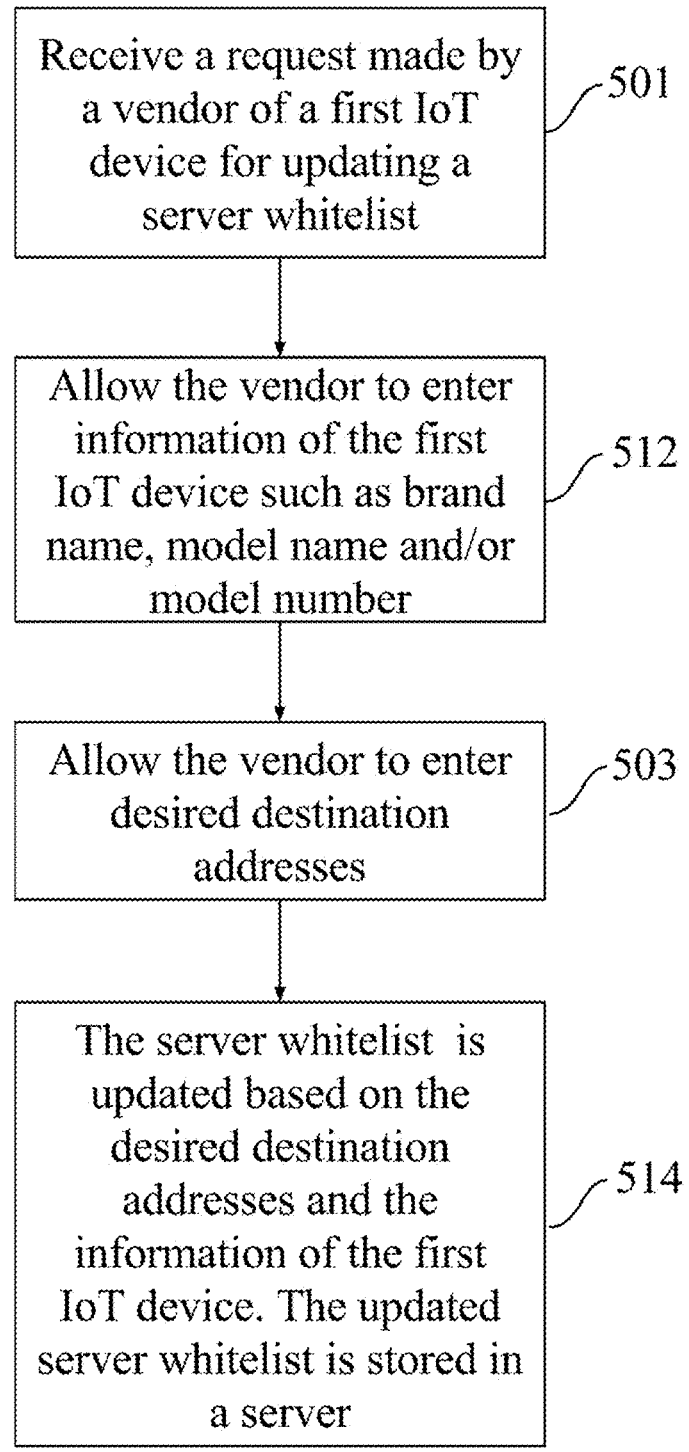
FIG. 5B illustrates an alternative workflow of FIG. 5A to update a server whitelist by a vendor of an IoT device at a server based on information of the IoT device according to one of the embodiments of the present invention.

FIG. 5B illustrates an exemplary embodiment of an alternative workflow of FIG. 5A to update a server whitelist by a vendor of an IoT device at a server based on information of the IoT device. One of the benefits of the workflow is that procedures of inputting the information of the IoT device are simple.

At block 501, server 150 receives a request made by a vendor of IoT device 130 for updating a whitelist via a webpage. At block 512, the vendor is provided with login information or login device, for example a username and a password or a security token, to gain an access to the webpage. Once the vendor enters the username and password to login the webpage, the vendor is allowed to enter information of the IoT device 130 includes, for example brand name, model name, model number, date of manufacture, place of manufacture via a pull-down menu or scrollable list.

At block 503, the vendor is allowed to enter desired destination addresses. At block 514, a server whitelist is updated based on the desired destination addresses and the information of IoT device 130. The updated server whitelist is stored in server 150.

Figure 6:
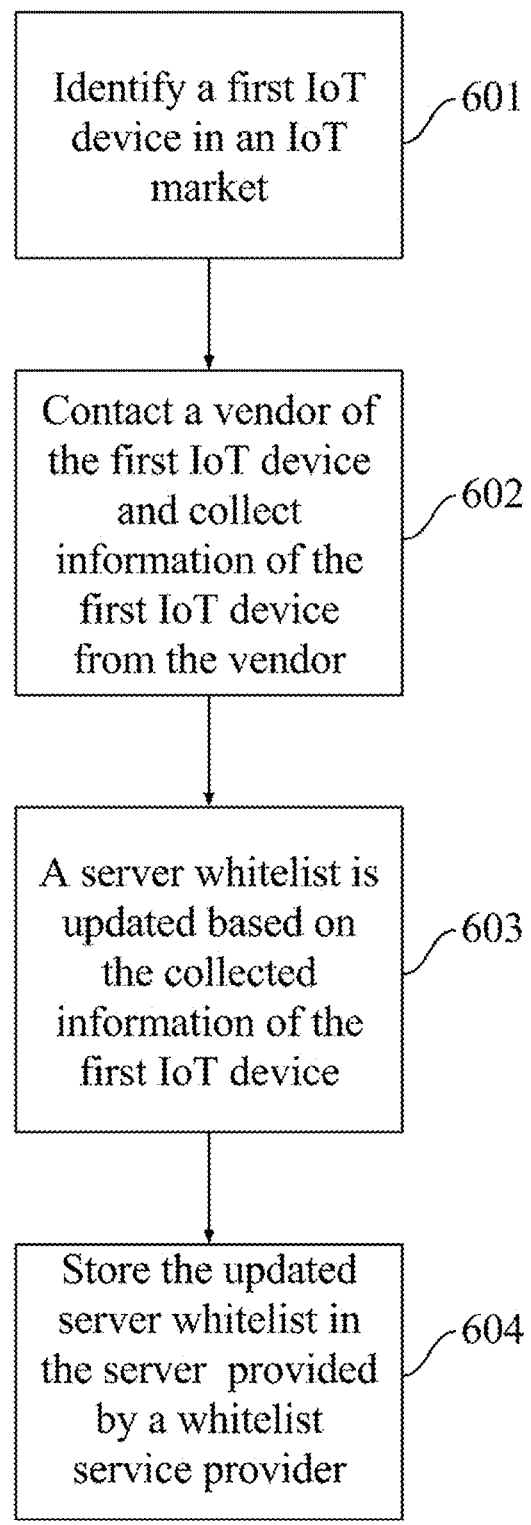
FIG. 6 illustrates a workflow of updating a server whitelist at a server by a whitelist service provider based on information of the IoT device collected from a vendor of the IoT device according to one of the embodiments of the present invention.

FIG. 6 illustrates an exemplary embodiment of workflow of updating a server whitelist based on information of IoT devices collected by a whitelist service provider. One of the benefits of the workflow is that a vendor of IoT devices is not required to enter information of the IoT devices.

At block 601, a whitelist service provider monitors an IoT device market and identifies any IoT devices missing from a whitelist managed by itself on a daily basis. For example, IoT device 130 is missing from a server whitelist stored in server 150. At block 602, the whitelist service provider contacts a vendor of IoT device 130 and collects information of IoT device 130 from the vendor.

The collected information of IoT device 130 includes, for example, brand name, model name, model number, serial number, date of manufacture, place of manufacture, MAC address, information of desired destination addresses (URL, domain name and IP address). At block 603, the whitelist service provider updates the server whitelist based on the collected information of IoT device 130. At block 604, the updated server whitelist is stored in server 150.

In one particular embodiment, a vendor of network node 120 subscribes a whitelist service that includes the whitelist for IoT device 130. Network node 120 is allowed to communicate with server 150 and retrieve the information of the server whitelist from server 150. Network node 120 updates a network node whitelist based on the information retrieved from server 150. The updated network node whitelist is stored in secondary storage 203 and is used by network node 120 to allow data packets to be transmitted to destination addresses on the network node whitelist.

The invention claimed is:
1. A method of restricting data packet transmission of an apparatus at a network node, comprising:

a) during a time period:
   i) updating, based on destination addresses of first data packets received from the apparatus and a Media Access Control (MAC) address of the apparatus, a whitelist; and
   ii) allowing unrestricted transmission of the first data packets and unrestricted receiving of second data packets by the apparatus according to the whitelist; and
b) after the time period:
   i) determining destination addresses of third data packets received from the apparatus;
   ii) allowing each of the third data packets to be sent to a respective destination address if a criteria is satisfactory; and
   iii) not allowing each of the third data packets to be sent to the respective destination address if the criteria is not satisfactory;

wherein:
the whitelist comprises the MAC address of the apparatus before updating the whitelist;
the whitelist further comprises the destination addresses of the first data packets after updating the whitelist;
the criteria is based on the destination addresses of the first data packets;
the criteria is satisfactory when the respective destination address matches one of the destination addresses of the first data packets; and
the whitelist list is stored in a non-transitory computer readable storage medium in the network node.

2. The method of claim 1, wherein;
the time period is less than one hour; and
the time period is a period of time for a processing unit of the network node to identify the destination addresses of the first data packets.

3. The method of claim 1, wherein the time period commences when the MAC address of the apparatus is detected by a processing unit of the network node.

4. The method of claim 3, further comprising storing the MAC address of the apparatus and the destination addresses of the first data packets in the whitelist when updating the whitelist.

5. The method of claim 3, further comprising storing an Internet Protocol (IP) address of the apparatus and the destination addresses of the first data packets in the whitelist when updating the whitelist.

6. The method of claim 1, wherein the time period commences when at least one of a brand name, a model name, and a model number of the apparatus is identified by a processing unit of the network node.

7. The method of claim 1, further comprising receiving an approval from a user of the apparatus or an administrator of the network node before performing (b)(ii).

8. The method of claim 1, further comprising:
c) during the time period:
   i) communicating with a remote server when the MAC address of the apparatus is not in the whitelist; and
   ii) retrieving destination addresses and a port number of the apparatus from the remote server;
wherein:
the whitelist further comprises the destination addresses and the port number of the apparatus after updating the whitelist; and
the MAC address of the apparatus is on a server whitelist of the remote server.

9. The method of claim 1, further comprising:
c) after the time period, resetting the time period to a new time period after receiving an instruction from a user of the apparatus or an administrator of the network node; and
d) during the new time period, updating the whitelist according to destination addresses of fourth data packets received from the apparatus.

10. The method of claim 1, further comprising:
c) during the time period, determining a maximum data packet transmission rate of the destination addresses of the first data packets;
wherein:
the whitelist further comprises the maximum data transmission rate after updating the whitelist; and
the criteria further comprises the maximum data transmission rate.

11. A network node that restricts data packet transmission of an apparatus, comprising:
at least one network interface;
at least one processing unit;
at least one main memory; and
at least one secondary storage storing program instructions executable by the at least one processing unit and configured to cause the at least one processing unit to perform:
a) during a time period:
   i) updating, based on destination addresses of first data packets received from the apparatus and a Media Access Control (MAC) address of the apparatus, a whitelist; and
   ii) allowing unrestricted transmission of the first data packets and unrestricted receiving of second data packets by the apparatus according to the whitelist; and
b) after the time period:
   i) determining destination addresses of third data packets received from the apparatus;
   ii) allowing each of the third data packets to be sent to a respective destination address if a criteria is satisfactory; and
   iii) not allowing each of the third data packets to be sent to the respective destination address if the criteria is not satisfactory;
wherein;
the whitelist comprises the MAC address of the apparatus before updating the whitelist;
the whitelist further comprises the destination-addresses of the first data packets after updating the whitelist;
the criteria is based on the destination addresses of the first data packets;
the criteria is satisfactory when the respective destination address matches one of the destination addresses of the first data packets; and
the whitelist list is stored in the at least one secondary storage in the network node.

12. The network node of claim 11, wherein:
the time period is less than one hour; and
the time period is a period of time for the at least one processing unit of the network node to identify the destination addresses of the first data packets.

13. The network node of claim 11, wherein the time period commences when the MAC address of the apparatus is detected by the at least one processing unit of the network node.

14. The network node of claim 13, wherein the program instructions executable by the at least one processing unit are further configured to cause the at least one processing unit to store the MAC address of the apparatus and the destination addresses of the first data packets in the whitelist when updating the whitelist.

15. The network node of claim 13, wherein the program instructions executable by the at least one processing unit are further configured to cause the at least one processing unit to store an Internet Protocol (IP) address of the apparatus and the destination addresses of the first data packets in the whitelist when updating the whitelist.

16. The network node of claim 11, wherein the time period commences when at least one of a brand name, a model name, and a model number of the apparatus is identified by the at least one processing unit of the network node.

17. The network node of claim 11, wherein the program instructions executable by the at least one processing unit are further configured to cause the at least one processing unit to receive an approval from a user of the apparatus or an administrator of the network node before performing (b)(ii).

18. The network node of claim 11, wherein the program instructions executable by the at least one processing unit are further configured to cause the at least one processing unit to:
  c) during the time period:
    i) communicate with a remote server when the MAC address of the apparatus is not in the whitelist; and
    ii) retrieve destination addresses and a port number of the apparatus from the remote server;
wherein:
  the whitelist further comprises the destination addresses and the port number of the apparatus after updating the whitelist; and
  the MAC address of the apparatus is on a server whitelist of the remote server.

19. The network node of claim 11, wherein the program instructions executable by the at least one processing unit are further configured to cause the at least one processing unit to:
  c) after the time period, reset the time period to a new time period after receiving an instruction from a user of the apparatus or an administrator of the network node; and
  d) during the new time period, update the whitelist according to destination addresses of fourth data packets received from the apparatus.

20. The network node of claim 11, wherein the program instructions executable by the at least one processing unit are further configured to cause the at least one processing unit to:
  c) during the time period, determine a maximum data packet transmission rate of each of the destination addresses of the first data packets;
wherein:
  the whitelist further comprises the maximum data transmission rate after updating the whitelist; and
  the criteria further comprises the maximum data transmission rate.

* * * * *